(12) United States Patent
Zhu et al.

(10) Patent No.: US 10,526,949 B2
(45) Date of Patent: Jan. 7, 2020

(54) THERMALLY INSULATING PROTECTIVE SLEEVE

(71) Applicant: Robert Bosch GmbH, Stuttgart (DE)

(72) Inventors: Xuejun Zhu, Jiang Su (CN); Pengbo Wang, Jiang Su (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/878,638

(22) Filed: Jan. 24, 2018

(65) Prior Publication Data
US 2018/0209322 A1    Jul. 26, 2018

(30) Foreign Application Priority Data
Jan. 24, 2017   (CN) .................. 2017 2 0100800 U

(51) Int. Cl.
| | | |
|---|---|---|
| F01N 13/14 | (2010.01) | |
| F28F 13/14 | (2006.01) | |
| F01N 3/20 | (2006.01) | |
| F16L 59/02 | (2006.01) | |

(52) U.S. Cl.
CPC .......... *F01N 13/14* (2013.01); *F01N 3/2066* (2013.01); *F28F 13/14* (2013.01); *F01N 2610/02* (2013.01); *F01N 2610/1433* (2013.01); *F01N 2610/1486* (2013.01); *F16L 59/023* (2013.01)

(58) Field of Classification Search
CPC ................ F16L 59/021–024; Y10T 156/1052
USPC ......................................... 138/156, 157, 151
See application file for complete search history.

(56) References Cited

U.S. PATENT DOCUMENTS

| | | | | |
|---|---|---|---|---|
| 1,618,455 | A * | 2/1927 | Lindsay ................ | F16L 59/024 138/147 |
| 4,972,759 | A * | 11/1990 | Nelson .................... | F24H 1/182 122/19.2 |
| 5,006,185 | A * | 4/1991 | Anthony ............... | F16L 59/023 138/151 |
| 7,757,722 | B1 * | 7/2010 | Lesch, Jr. ............. | F16L 59/024 137/375 |
| 2013/0291984 | A1 * | 11/2013 | Himmel ................. | F16L 59/02 29/428 |
| 2015/0114510 | A1 * | 4/2015 | Zettell ................... | F16L 59/023 138/149 |

* cited by examiner

*Primary Examiner* — Patrick F Brinson
(74) *Attorney, Agent, or Firm* — Michael Best & Friedrich LLP

(57) ABSTRACT

A thermally insulating protective sleeve. The thermally insulating protective sleeve comprises a tubular shell and a thermally insulating liner located in the tubular shell and made of a thermally insulating soft material. The shell comprises two longitudinally separated half-parts, the two half-parts being detachably connected to each other. The thermally insulating liner defines a hollow opening in the shell, and an object to be thermally insulated can be received in the hollow opening in such a way that the thermally insulating liner is subjected to pressure in a radial direction.

14 Claims, 2 Drawing Sheets

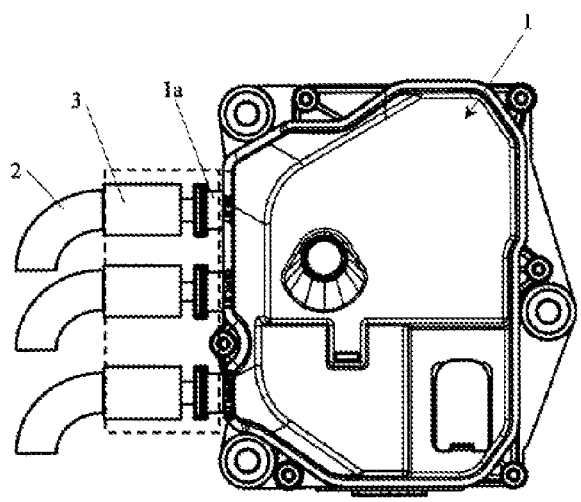
Fig. 1
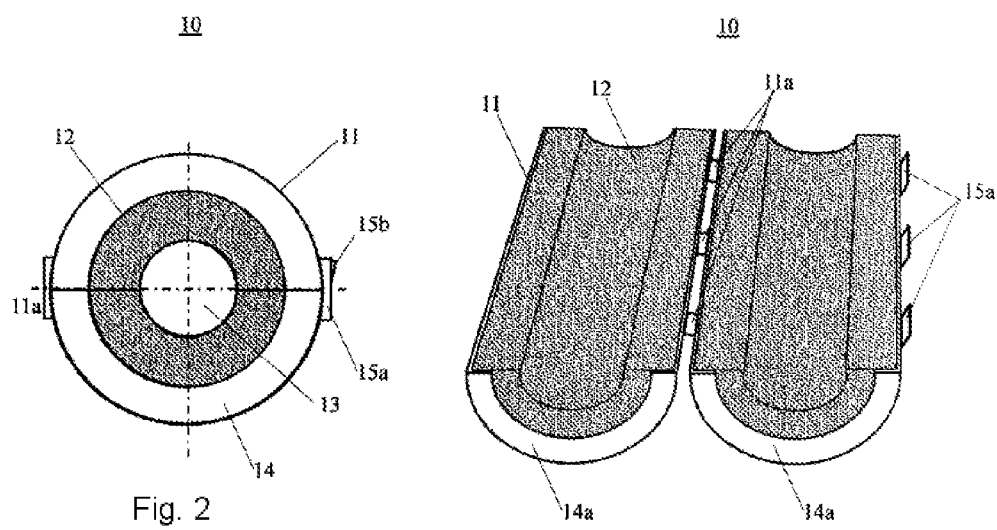
Fig. 2
Fig. 4

THERMALLY INSULATING PROTECTIVE SLEEVE

BACKGROUND OF THE INVENTION

The present application relates to a connector thermally insulating protective sleeve, in particular a connector thermally insulating protective sleeve connected to a urea solution supply pump.

Selective catalytic reduction after-treatment systems are already widely used in diesel engines at the present time, due to legislation and environmental protection requirements. Such a selective catalytic reduction after-treatment system comprises a urea solution supply pump, connected via a connecting pipeline to a nozzle for injecting urea solution into an exhaust gas treatment mixing apparatus.

Generally, in order to facilitate installation and post-maintenance, such a urea solution supply pump is in direct contact with the outside air after being installed in place. The connecting pipeline is detachably connected to an outlet of the urea solution supply pump by means of a connector.

The connecting pipeline itself may be an electrically heated pipe, in order to be electrically heated to prevent freezing of feed liquid in the pipeline when the air temperature is especially low in winter. The urea solution supply pump itself is also provided with a self-heated thawing apparatus. However, the region where the connector is connected to the outlet generally has no electrically heated means of protection; hence, when the air temperature is especially low in winter and the diesel engine has been switched off for a long period of time, urea solution in the connector and/or outlet freezes, and if the engine is started again, such frozen urea is very difficult to melt quickly. Thus delivery of urea solution from the supply pump is affected, and this in turn has an impact on the exhaust gas treatment effect of the selective catalytic reduction after-treatment system.

Furthermore, other liquid feed apparatuses in which connection ports are exposed to the outside also have similar problems.

SUMMARY OF THE INVENTION

The aim of the present application is to propose a connector thermally insulating protective sleeve, for covering a connection region, exposed to the outside, of a liquid feed apparatus, in particular a urea solution supply pump, so as to have a thermal insulation effect during self-heating and thawing of a connecting pipeline and/or a urea solution supply pump, to realize rapid thawing at this site.

According to one aspect of the present application, a thermally insulating protective sleeve is provided; the thermally insulating protective sleeve comprises a tubular shell and a thermally insulating liner located in the tubular shell, and the shell comprises two longitudinally separated half-parts, the two half-parts being detachably connected to each other, the thermally insulating liner defining a hollow opening in the shell, and an object to be thermally insulated can be received in the hollow opening in such a way that the thermally insulating liner is subjected to pressure in a radial direction.

Optionally, a semi-annular sidewall is integrally formed at at least one longitudinal end of each half-part of the shell, a radial dimension of the sidewall being greater than a wall thickness of the shell but less than the thickness of the thermally insulating liner.

Optionally, the thermally insulating liner is adhered to an inside wall of the shell.

Optionally, the thermally insulating liner comprises two longitudinally separated half-parts.

Optionally, the shell comprises a hinge part which pivotably connects the two half-parts to each other, and a fastening structure which locks the two half-parts together releasably, wherein when viewed from the direction of a cross section of the shell, the fastening structure is disposed diametrically opposite the hinge part.

Optionally, there are multiple said hinge parts, separated from each other longitudinally; and/or there are multiple said fastening structures, separated from each other longitudinally.

Optionally, each fastening structure comprises a fastening ring part disposed on one half-part of the shell, and a protrusion disposed on the other half-part, the fastening ring part having an opening capable of mating with the protrusion.

Optionally, the shell is made of PA 66, and/or; the thermally insulating liner is made of a PVC/NBR rubber/plastic blend, the shell being of a hardness greater than that of the thermally insulating liner.

Optionally, the object to be thermally insulated is a liquid discharge port of a urea solution supply pump of a selective catalytic reduction after-treatment system, and/or a connector for connecting to the liquid discharge port.

According to another aspect of the present application, also provided is a urea solution supply pump of a selective catalytic reduction after-treatment system, comprising a liquid discharge port, and being connected to a connector at the liquid discharge port, wherein the liquid discharge port and/or the connector is/are enclosed by the abovementioned thermally insulating protective sleeve.

Using the thermally insulating protective sleeve of the present application, an exposed port of a urea solution supply pump and an associated connector can be thermally insulated and protected, and rapid thawing during self-thawing can be ensured. In addition, such a thermally insulating protective sleeve is simple to manufacture, easy to install, and allows post-maintenance to be performed easily.

DESCRIPTION OF THE DRAWINGS

The following detailed explanation, in combination with the accompanying drawings below, will enable a more comprehensive understanding of the abovementioned and other aspects of the present application. It must be pointed out that the proportions in the drawings might vary for the purpose of clear explanation, but this will not affect understanding of the present application. In the drawings:

FIG. 1 shows schematically an exposed connection region of a urea solution supply pump and a pipeline connector.

FIG. 2 is an end view of a thermally insulating protective sleeve according to an embodiment of the present application.

FIG. 4 is a perspective drawing of a thermally insulating protective sleeve after being opened.

DETAILED DESCRIPTION

Figure 3:
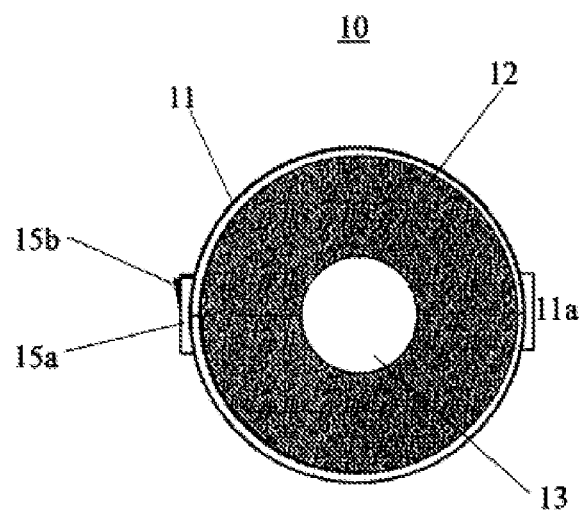
FIG. 3 is a cross-sectional view of the thermally insulating protective sleeve in FIG. 2.

In the accompanying drawings of the present application, features which are identical in structure or similar in function are indicated by identical reference labels.

FIG. 1 presents a scenario in which a thermally insulating protective sleeve according to the present application is to be used, taking as an example a urea solution supply pump of a selective catalytic reduction after-treatment system. However, it should be clear to those skilled in the art that other similar liquid feed apparatuses could also employ the thermally insulating protective sleeve presented below according to the present Description.

As shown in FIG. 1, a urea solution supply pump 1 is provided with connection ports 1a on a shell thereof, e.g. three connection ports. Each connection port 1a matches a connector 3. Each connector 3 is connected to an electrically heated pipe 2, for the purpose of feeding liquid to a downstream mixing apparatus of a selective catalytic reduction after-treatment system (not shown).

For example, the electrically heated pipe 2 is provided with an internal electric heating layer, which can be electrified to provide heating when the air temperature is very cold, to ensure that liquid does not freeze in the pipe. However, as shown by the dotted-line box in FIG. 1, a region between the connector 3 and the port 1a is exposed to the outside, and cannot be provided with a similar electric heating layer. Thus, when the air temperature is very cold in winter, the region shown freezes, thereby affecting the supply of liquid between the urea solution supply pump and the electrically heated pipe when the engine is started again.

FIG. 2 shows schematically a thermally insulating protective sleeve 10 suitable for the connector 3 and/or the port 1a according to an embodiment of the present application. The thermally insulating protective sleeve 10, between the connector 3 and the port 1a, can surround them, to ensure thermal insulation from the surroundings.

Further referring to FIG. 4, the thermally insulating protective sleeve 10 is substantially cylindrical, having a shell 11 and an internal thermally insulating liner 12. The shell 11 is a thin-shell structure, of a hardness greater than that of the internal thermally insulating liner 12, and used to support and fix the internal thermally insulating liner 12. The internal thermally insulating liner 12 is made of a thermally insulating material, has a certain thickness and deforms easily when subjected to pressure, so as to tightly enclose the connector and the port 1a of the urea solution supply pump 1 after surrounding them, under the squeezing action of the shell 11, to provide a better thermally insulating effect. For example, in order to be capable of deforming and realizing heat insulation, the internal thermally insulating liner 12 can be manufactured as a foamed structure.

The shell 11 may be made of a hard plastic such as PA 66. The internal thermally insulating liner 12 may be made of a rubber/plastic blend such as PVC/NBR. As shown in FIG. 4, the shell 11 is made in such a way as to be split in two in a longitudinal direction, with two half-parts being connected by a hinge part 11a therebetween; in the figure, there are three hinge parts 11a. Each hinge part 11a may be a hinge portion formed integrally with the shell 11, or an independent hinge installed on the half-part after the latter has been prepared.

For example, the internal thermally insulating liner 12 may be longitudinally split in two, like the shell 11, with each half-part of the internal thermally insulating liner 12 being fixed by adhesion to an inside wall of the shell 11. Thus, once the two half-parts of the shell 11 have been fastened together as shown in FIG. 2, a hollow cylindrical opening 13 is defined around a longitudinal central axis of the thermally insulating protective sleeve 10. The internal diameter of the hollow opening 13 is slightly smaller than the maximum external diameter at the site of the connector 3 and the port 1a, ensuring that when the shell 11 is closed, the internal thermally insulating liner 12 can be in tighter contact with outer surfaces of the connector and the port.

Furthermore, as shown in FIG. 4, a semi-annular sidewall 14a is integrally formed at a longitudinal end of each half-part of the shell 11, so that once the two half-parts have been joined together as shown in FIG. 2, an annular sidewall 14 is formed. For example, the annular sidewall 14 partially blocks the internal thermally insulating liner 12 in a radial direction, and is radially dimensioned so as not to come into contact with the connector 3 and/or port 1a to be thermally insulated; thus, a greater thermal insulation effect is provided while ensuring that the internal thermally insulating liner 12 does not shift axially. Such an annular sidewall 14 may be disposed at one end or both ends of the shell 11 in the longitudinal direction.

Figure 5:
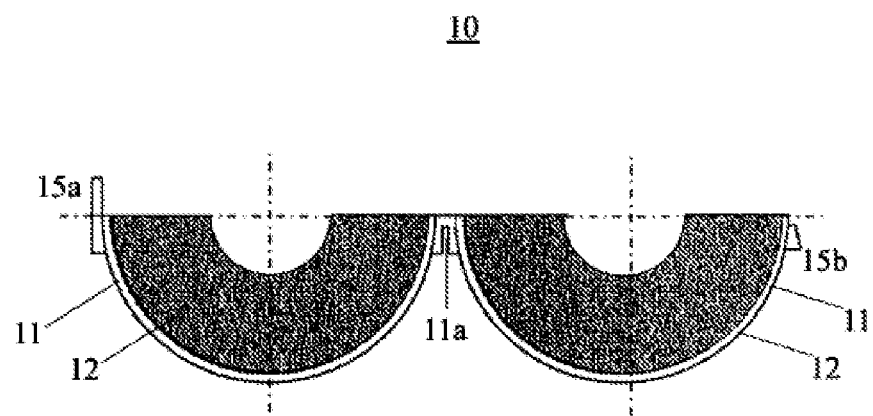
FIG. 5 is a cross-sectional view of an insulating protective sleeve after being opened.

A fastening structure is also provided on the shell 11. Viewed from the direction of a cross section of the shell 11, said cross section being perpendicular to the central axis, the fastening structure is disposed diametrically opposite the hinge part. For example, as shown in FIGS. 3 to 5, the fastening structure comprises a fastening ring part 15a disposed on one half-part of the shell 11, and a protrusion 15b disposed on the other half-part. The fastening ring part 15a and protrusion 15b are made of the same material as the shell 11, and for example may be formed integrally with the shell 11, but could also be independent components adhered to the shell at a later stage. An opening is formed in each fastening ring part 15a, and when the two half-parts of the shell 11 are closed together, the protrusion 15b is exactly configured to be able to enter the opening of the fastening ring part 15a, ensuring that these two half-parts do not separate again accidentally. Thereafter, the shell 11 can be opened again by merely pressing the fastening ring part 15a slightly to disengage the protrusion 15b.

Multiple pairs of the abovementioned fastening ring parts 15a and protrusions 15b may be disposed on the shell 11 at intervals in the longitudinal direction; for example, three pairs are shown in FIG. 4. Furthermore, it should be clear to those skilled in the art that the fastening structure is not limited to the scenario shown in the figures. For example, the fastening structure could also be disposed in the form of any other releasable locking structure, such as hook-and-loop or snap fasteners.

In an alternative embodiment, the internal thermally insulating liner 12 could also be a complete thermally insulating liner, so that when installation is carried out, first of all the complete thermally insulating liner is used to enclose the connector 2 and/or the port 1a, then the two half-parts of the shell 11 are fastened together so as to surround the thermally insulating liner. In another alternative embodiment, it is even possible to omit the abovementioned fastening structure, and wrap the periphery of the shell 11 directly with a binding strap or hook-and-loop strap to accomplish fixing. In another alternative embodiment, the hinge part on the shell 11 could also be replaced by the fastening structure.

The thermally insulating protective sleeve of the present application is simple to manufacture, convenient to install, easy to dismantle, and easy to replace at a later stage. Most importantly, it can thermally isolate the region of the connector and port from the surroundings efficiently, so that during a thawing operation performed by heating apparatuses located at two ends of the thermally insulating protective sleeve, such as the electrically heated pipe 2 and the self-heated thawing apparatus of the urea solution supply pump 1, frozen solution in the connector 2 and/or the port 1a can be thawed more quickly.

Although specific embodiments of the present application have been described in detail here, they are provided solely for the purpose of explanation, and should not be regarded as constituting a limitation of the scope of the present application. Various substitutions, changes and modifications could be conceived, on condition that the spirit and scope of the present application are not departed from.

The invention claimed is:

1. A thermally insulating protective sleeve (10) comprising an annular, hard tubular shell (11) and a thermally insulating two-part liner (12) located in the tubular shell, the shell being of a hardness greater than that of the thermally insulating liner, and the shell comprising two longitudinally separated half-parts, the two half-parts being detachably connected to each other, the thermally insulating liner defining a hollow opening (13) in the shell, wherein the liner is configured such that an object to be thermally insulated can be received in the hollow opening (13) in such a way that the thermally insulating liner (12) is subjected to an evenly distributed pressure in a radial direction, wherein a semi-annular sidewall is integrally formed at at least one longitudinal end of each half-part of the shell, a radial dimension of the sidewall being greater than a wall thickness of the shell but less than the thickness of the thermally insulating liner, and wherein the thermally insulating protective sleeve encloses a liquid discharge port and/or a connector at the liquid discharge port of a urea solution supply pump of a selective catalytic reduction after-treatment system.

2. A thermally insulating protective sleeve according to claim 1, characterized in that the thermally insulating liner (12) is adhered to an inside wall of the shell (11).

3. A thermally insulating protective sleeve according to claim 1, characterized in that the thermally insulating liner (12) comprises two longitudinally separated half-parts.

4. A thermally insulating protective sleeve according to claim 1, characterized in that the shell (11) comprises a hinge part (11a) which pivotably connects the two half-parts to each other, and a fastening structure which locks the two half-parts together releasably, wherein when viewed from the direction of a cross section of the shell (11), the fastening structure is disposed diametrically opposite the hinge part.

5. A thermally insulating protective sleeve according to claim 4, comprising multiple said hinge parts (11a), separated from each other longitudinally; and/or multiple said fastening structures, separated from each other longitudinally.

6. A thermally insulating protective sleeve according to claim 5, characterized in that each fastening structure comprises a fastening ring part (15a) disposed on one half-part of the shell, and a protrusion (15b) disposed on the other half-part, the fastening ring part having an opening capable of mating with the protrusion.

7. A thermally insulating protective sleeve according to claim 6, characterized in that the shell (11) is made of PA 66, and/or; the thermally insulating liner (12) is made of a PVC/NBR rubber/plastic blend, the shell being of a hardness greater than that of the thermally insulating liner.

8. A thermally insulating protective sleeve according to claim 7, characterized in that the object to be thermally insulated is a liquid discharge port of a urea solution supply pump of a selective catalytic reduction after-treatment system, and/or a connector for connecting to the liquid discharge port.

9. A thermally insulating protective sleeve according to claim 2, characterized in that the thermally insulating liner (12) comprises two longitudinally separated half-parts.

10. A thermally insulating protective sleeve according to claim 9, characterized in that the shell (11) comprises a hinge part (11a) which pivotably connects the two half-parts to each other, and a fastening structure which locks the two half-parts together releasably, wherein when viewed from the direction of a cross section of the shell (11), the fastening structure is disposed diametrically opposite the hinge part.

11. A thermally insulating protective sleeve according to claim 10, characterized in that there are multiple said hinge parts (11a), separated from each other longitudinally; and/or there are multiple said fastening structures, separated from each other longitudinally.

12. A thermally insulating protective sleeve according to claim 11, characterized in that each fastening structure comprises a fastening ring part (15a) disposed on one half-part of the shell, and a protrusion (15b) disposed on the other half-part, the fastening ring part having an opening capable of mating with the protrusion.

13. A thermally insulating protective sleeve according to claim 12, characterized in that the shell (11) is made of PA 66, and/or; the thermally insulating liner (12) is made of a PVC/NBR rubber/plastic blend, the shell being of a hardness greater than that of the thermally insulating liner.

14. A thermally insulating protective sleeve according to claim 13, characterized in that the object to be thermally insulated is a liquid discharge port of a urea solution supply pump of a selective catalytic reduction after-treatment system, and/or a connector for connecting to the liquid discharge port.

* * * * *